US012717186B2

(12) United States Patent
Chang et al.

(10) Patent No.: US 12,717,186 B2
(45) Date of Patent: Aug. 25, 2026

(54) BACKLIGHT MODULE CAPABLE OF ENHANCING BRIGHTNESS

(71) Applicant: ENTIRE TECHNOLOGY CO., LTD., Taoyuan City (TW)

(72) Inventors: Yu Wei Chang, Taoyuan City (TW); Chia Yin Yao, Taoyuan City (TW); Jen Chun Chung, Taoyuan City (TW)

(73) Assignee: ENTIRE TECHNOLOGY CO., LTD., Taoyuan City (TW)

( * ) Notice: Subject to any disclaimer, the term of this patent is extended or adjusted under 35 U.S.C. 154(b) by 0 days.

(21) Appl. No.: 19/308,215

(22) Filed: Aug. 23, 2025

(65) Prior Publication Data

US 2026/0072307 A1 Mar. 12, 2026

(30) Foreign Application Priority Data

Sep. 6, 2024 (TW) ................................ 113133916

(51) Int. Cl.
*G02F 1/13357* (2006.01)

(52) U.S. Cl.
CPC .. *G02F 1/133606* (2013.01); *G02F 1/133603* (2013.01)

(58) Field of Classification Search
CPC ......... G02F 1/133606; G02F 1/133603; G02F 1/133602; G02F 1/1336; G02F 1/133605; G02F 1/133607; G02F 1/133611; F21V 5/04; F21V 5/007; F21V 9/00; F21V 13/04; F21V 13/00
See application file for complete search history.

(56) References Cited

U.S. PATENT DOCUMENTS

2009/0032827 A1* 2/2009 Smits .................. H10H 20/853 257/E33.059
2020/0072445 A1* 3/2020 Su ............................ F21V 3/00
2024/0210755 A1* 6/2024 Yang ................ G02F 1/133603

* cited by examiner

*Primary Examiner* — Bao Q Truong

(57) ABSTRACT

A backlight module capable of enhancing brightness can be used with a Liquid Crystal Display (LCD). The backlight module comprises a secondary optical lens that can appropriately distribute the light emitted by the LED, and a diffuser plate with a unique light diffusion effect. The backlight module not only provides a refractive-reflective hybrid secondary optical lens on the LED to appropriately distribute the light emitted by the LED, but also provides a plurality of microstructures on the light-inlet surface of the diffuser plate, and provides a plurality of diffusion particles in the diffuser plate, and also provides a plurality of microbubbles evenly distributed in the diffuser plate by using extruding foaming technology. In this way, the light of the LED can be optimally distributed and diffused, thereby shielding the MURA to produce a surface light source with increased brightness and uniformity.

10 Claims, 4 Drawing Sheets

BACKLIGHT MODULE CAPABLE OF ENHANCING BRIGHTNESS

BACKGROUND OF INVENTION

1. Field of the Invention

The present invention relates to a backlight module capable of enhancing brightness, and more particularly to a backlight module capable of providing better optical properties and being used in conjunction with a liquid crystal display (LCD) and comprising components such as light-emitting diodes, secondary optical lenses and a diffuser plate.

2. Description of the Prior Art

In the development of backlight display, as the design of modern backlight display tends to be thinner, the backlight module is bound to face the demand for ultra-thinness. The direct-type backlight module using light-emitting diodes (LEDs) as the direct-type light source has a lower optical distance (OD) due to the thin design, and the light intensity is higher, but the MURA (that is, the light-emitting surface has light-dark bands or moire defects) is more serious. Although the prior art sets a secondary optical lens on the LED to disperse the light emitted by the LED, thereby reducing the thickness of the backlight module; however, when the distance between adjacent LEDs increases and the OD distance decreases, the center of the light spot directly above the LED on the light-emitting surface of the backlight module will be too bright, thereby generating MURA. The existing technology uses a secondary optical lens to distribute the light emitted from the LED for a second time, and the existing method is to disperse the LED light as far as possible in a large angle to improve uniformity. However, it also changes and decreases the light intensity in the middle of the LED, resulting in a lower brightness in the middle, which limits the effect of decreasing MURA.

Therefore, if the existing secondary optical lens is used with a traditional diffuser plate in a low optical distance backlight module, the light diffusion effect can no longer meet the requirements.

This invention combines a secondary optical lens for light distribution with a unique diffuser plate for backlight modules. Not only does a refractive-reflective hybrid secondary optical lens positioned on the LED properly distribute the light, but microstructures are also incorporated into the diffuser plate's light-entering surface. Furthermore, diffusion particles are added to the diffuser plate, extruded using foaming technology to create uniformly distributed microbubbles within the diffuser plate. The diffuser plate of the invention has a multi-layered structure which diffuses the LED light, thereby achieving MURA shielding and producing a uniform, brighter, surface light source.

SUMMARY OF THE INVENTION

The primary objective of the invention is to provide a backlight module capable of enhancing brightness, which can be used with a Liquid Crystal Display (LCD). The backlight module comprises a secondary optical lens that can appropriately distribute the light emitted by the LED, and a diffuser plate with a unique light diffusion effect. The backlight module not only provides a refractive-reflective hybrid secondary optical lens on the LED to appropriately distribute the light emitted by the LED, but also provides a plurality of microstructures on the light-inlet surface of the diffuser plate, and provides a plurality of diffusion particles in the diffuser plate, and also provides a plurality of microbubbles evenly distributed in the diffuser plate by using extruding foaming technology. In this way, the light of the LED can be optimally distributed and diffused, thereby shielding the MURA to produce a surface light source with increased brightness and uniformity.

In order to achieve the aforementioned objectives, the invention discloses a backlight module capable of enhancing brightness, which comprises: a substrate, a plurality of LED light-emitting elements, a plurality of secondary optical lenses, and a diffuser plate. The substrate has a top surface; a circuit layout and a reflective layer. The reflective layer is located on the top surface. The plurality of LED light-emitting elements is arranged in an array on the top surface of the substrate and electrically coupled to the circuit layout. Each of the LED light-emitting elements has a light-emitting area that can emit light. The light-emitting area is defined with a light-emitting axis which extends vertically upward from a center point of the light-emitting area. Each of the secondary optical lenses is fixed on the top surface of the substrate at a position corresponding to one of the LED light-emitting elements and covering the light-emitting area of the corresponding LED light-emitting element. The diffuser plate locates above the substrate and comprises: a plate body, a plurality of first diffusion particles, a plurality of second diffusion particles, a plurality of microbubbles, and a plurality of microstructures. The plate body has an upper surface and a lower surface. The lower surface faces the substrate. The plate body is a multi-layer structure formed by co-extrusion. The plate body comprises a main layer, an upper surface layer, and a lower surface layer. The upper surface layer is stacked on a side of the main layer facing the upper surface, and the lower surface layer is stacked on another side of the main layer facing the lower surface. The first diffusion particles are added to the main layer. The second diffusion particles are added to the upper surface layer and the lower surface layer. The microbubbles are formed in the main layer by a foaming co-extrusion process. The microstructures are arranged in an array on at least the lower surface of the plate body. Wherein, each of the secondary optical lenses is capable of diffusing the light emitted from the light-emitting area of the corresponding light-emitting element in a manner of refraction, reflection, or both refraction and reflection. In addition, among the light emitted upward from the light-emitting area of the light-emitting element, a light intensity within an angle range of +30° to −30° with the light-emitting axis is between 15% and 25% of the total light intensity of the light-emitting element, and the light intensity within the angle range of +60° to +70° and −60° to −70° with the light-emitting axis is between 75% and 85% of the total light intensity of the light-emitting element.

In a preferred embodiment, a base material of the main layer of the plate body includes at least one of the following: polycarbonate (PC), polystyrene (PS), polymethyl methacrylate (PMMA, commonly known as acrylic), polyethylene (PE), polypropylene (PP), and polyethylene terephthalate (PET); base materials of the upper surface layer and the lower surface layer of the plate body include polymethyl methacrylate (PMMA). The first diffusion particles are formed by adding a first diffusion particle additive to the main layer. The first diffusion particle additive includes first diffusion particles. The weight percentage of the added first diffusion particle additive in the main layer is a first weight percentage. Each of the first diffusion particles has a first material refractive index. The second diffusion particles are formed by adding a second diffusion particle additive to both the upper surface layer and the lower surface layer. The second diffusion particle additive includes the second diffusion particles. The weight percentage of the added second diffusion particle additive in the upper surface layer and the lower surface layer is a second weight percentage. Each of the second diffusion particles has a second material refractive index. Wherein the diffuser plate meets at least one of the following two conditions:

Condition 1: the first material refractive index of the first diffusion particles is smaller than the second material refractive index of the second diffusion particles; and Condition 2: the first weight percentage of the first diffusion particle additive is less than the second weight percentage of the second diffusion particle additive.

In a preferred embodiment, the first diffusion particles contained in the first diffusion particle additive include at least one of the following polymer particles: silicone beads, acrylic beads (PMMA beads), polystyrene beads (PS beads), and acrylic-polystyrene copolymer beads (PMMA-PS beads); wherein a particle size of the first diffusion particles is between 1-4 μm; a value of the first material refractive index is between 1.42 and 1.5; the first weight percentage of the first diffusion particle additive added in the main layer is between 1-4%.

In a preferred embodiment, the second diffusion particles contained in the second diffusion particle additive include at least one of the following polymer particles: silicone beads, acrylic beads (PMMA beads), polystyrene beads (PS beads), and acrylic-polystyrene copolymer beads (PMMA-PS beads); wherein a particle size of the second diffusion particles is between 15-25 μm; a value of the second material refractive index is between 1.42 and 1.5; the second weight percentage of the second diffusion particle additive added in the upper surface layer and the lower surface layer is between 5-10%; wherein, the second weight percentage is greater than the first weight percentage, and the particle size of the second diffusion particles is greater than the particle size of the first diffusion particles.

In a preferred embodiment, the second diffusion particles contained in the second diffusion particle additive include at least one of the following inorganic particles: calcium carbonate, barium sulfate, titanium oxide, talc, mica, and boron nitride; wherein a particle size of the second diffusion particles is between 0.05-8 μm; a value of the second material refractive index is between 1.5 and 2.6; the second weight percentage of the second diffusion particle additive added in the upper surface layer and the lower surface layer is between 0.1-1.5%.

In a preferred embodiment, the microbubbles are generated by adding a foaming agent and a nucleating agent during the foaming co-extrusion process. The nucleating agent comprises at least one of the following: calcium carbonate, silicon dioxide, and calcium oxide; a weight percentage of the added nucleating agent is 0.1%-0.5%. A weight reduction rate of the microbubbles to the main layer is 10-20%, and an average size of the microbubbles is between 60~800 μm; wherein, a calculation formula of the weight reduction rate is:

$$\text{weight reduction rate }(\%) = (W1 - W2)/W2 * 100\%;$$

$$W1 = H * (L1 * L2 * D);$$

wherein:

H is an average thickness of the main layer (mm);

L1 is a length of the main layer (mm);

L2 is a width of the main layer (mm);

D is a density of a raw material of the main layer ($g/mm^3$);

W1 is a theoretical weight (g) of the main layer, that is, the weight when the microbubbles are not included;

W2 is an actual weight (g) of the main layer, that is, the actual weight of the main layer containing a plurality of the microbubbles is actually weighed by a scale.

In a preferred embodiment, each of the secondary optical lenses comprises a lens body and a blind-hole space located inside the lens body; the LED light-emitting element is accommodated in the blind-hole space and is covered by the lens body; the secondary optical lens is a refractive-reflective hybrid optical lens. The lens body of the secondary optical lens has at least one reflective surface and at least one refractive surface; when the light is emitted from the light-emitting area of the LED light-emitting element located in the blind-hole space, the light will be reflected by the reflective surface if the light is incident on the reflective surface, otherwise, the light will be refracted at least once and then emitted out of the lens body if the light is incident on the refractive surface. The lens body has a bottom part, a side extension part and a light-output part from bottom to top; the bottom part is fixed to the top surface of the substrate. The side extension part extends upward from the bottom part to a height that is not less than a thickness of the LED light-emitting element. The light-output part is located at the top of the side extension part and includes a curved outer surface exposed to the outside and a curved inner surface exposed to the blind-hole space.

In a preferred embodiment, the at least one reflective surface is provided on the curved inner surface of the light-output part of the lens body of the secondary optical lens, and except for the reflective surface, other parts of the curved inner surface of the light-output part are all provided with the refractive surface. A structure of the at least one reflective surface is one of the following: a reflective coating applied to the curved inner surface of the light-output part at a location corresponding to the at least one reflective surface; a reflective film attached to the curved inner surface of the light-output part at the location corresponding to the at least one reflective surface; an inclined plane with an appropriate inclination angle provided on the curved inner surface of the light-output part at the location corresponding to the at least one reflective surface in order to reflect the light emitted from the light-emitting area of the LED light-emitting element; and a curved surface with a suitable curvature provided on the curved inner surface of the light-output part at the location corresponding to the at least one reflective surface in order to reflect the light emitted from the light-emitting area of the LED light-emitting element.

In a preferred embodiment, the at least one reflective surface is provided on the curved outer surface of the light-output part of the lens body of the secondary optical lens, and except for the reflective surface, other parts of the curved outer surface of the light-output part are all provided with the refractive surface. A structure of the at least one reflective surface is one of the following: a reflective coating applied to the curved outer surface of the light-output part at a location corresponding to the at least one reflective surface; a reflective film attached to the curved outer surface of the light-output part at the location corresponding to the at least one reflective surface; an inclined plane with an appropriate inclination angle provided on the curved outer surface of the light-output part at the location corresponding to the at least one reflective surface in order to reflect the light emitted from the light-emitting area of the LED light-emitting element; and a curved surface with a suitable curvature provided on the curved outer surface of the light-output part at the location corresponding to the at least one reflective surface in order to reflect the light emitted from the light-emitting area of the LED light-emitting element.

In a preferred embodiment, the microstructures include a plurality of N-sided pyramid-shaped structures, wherein N is a positive integer greater than or equal to three; the backlight module further comprises: an optical film, a brightness enhancement film (BEF), and a dual brightness enhancement film (DBEF). The optical film is directly attached to the upper surface of the plate body of the diffuser plate. The brightness enhancement film (BEF) is directly attached to the optical film. The dual brightness enhancement film (DBEF) is directly attached to the brightness enhancement film (BEF). Wherein the backlight module is configured to be assembled on a liquid crystal display (LCD), and the LCD is located above the dual brightness enhancement film (DBEF).

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention refers to a backlight module capable of enhancing brightness, which can be used with a Liquid Crystal Display (LCD). The backlight module comprises a secondary optical lens that can appropriately distribute the light emitted by the LED, and a diffuser plate with a unique light diffusion effect. The backlight module not only provides a refractive-reflective hybrid secondary optical lens on the LED to appropriately distribute the light emitted by the LED, but also provides a plurality of microstructures on the light-inlet surface of the diffuser plate, and provides a plurality of diffusion particles in the diffuser plate, and also provides a plurality of microbubbles evenly distributed in the diffuser plate by using extruding foaming technology. In this way, the light of the LED can be optimally distributed and diffused, thereby shielding the MURA to produce a surface light source with increased brightness and uniformity.

In order to more clearly describe the backlight module for enhancing brightness and its manufacturing method proposed by the present invention, the following will be described in detail with reference to the drawings.

Figure 1:
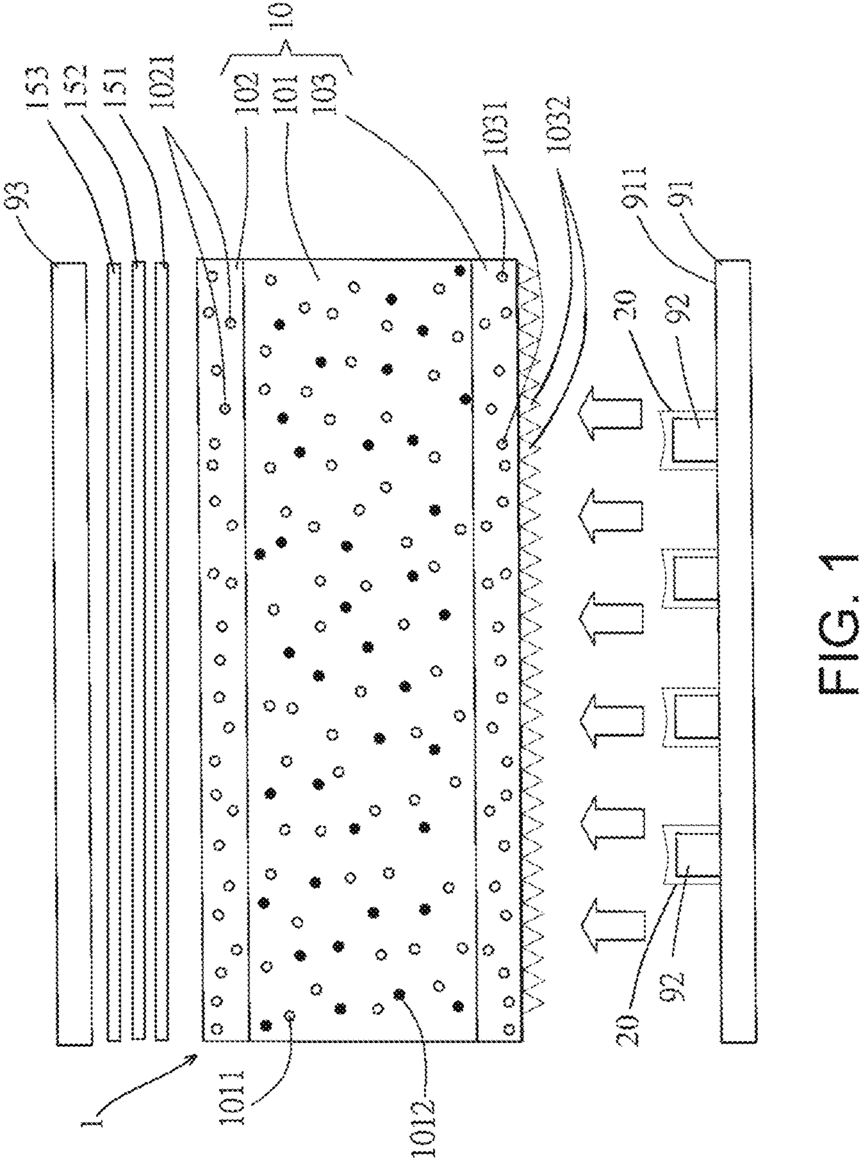
FIG. 1 is a schematic cross-sectional view of an embodiment of a backlight module capable of enhancing brightness according to the present invention used in conjunction with a liquid crystal display to form a backlight display.

Please refer to FIG. 1, which is a schematic cross-sectional view of an embodiment of a backlight module capable of enhancing brightness according to the present invention used in conjunction with a liquid crystal display (LCD) to form a backlight display. The backlight module of the present invention is installed under a liquid crystal display (LCD) 93 to form a backlight display. In a first embodiment of the invention, the backlight module comprises, from bottom to top, a substrate 91, a plurality of light-emitting elements 92, a diffuser plate 1, an optical film 151, a brightness enhancement film (BEF) 152, and a dual brightness enhancement film (DBEF) 153. The substrate 91 has a top surface 911. A circuit layout (not shown) and a reflective layer are provided on the substrate 91. The reflective layer is provided on the top surface 911. The light-emitting elements 92 are arranged in an array format on the top surface 911 of the substrate 91 and are electrically coupled to the circuit layout. Each of the light-emitting elements 92 has a light-emitting area (not numbered in the figure) that can emit light upward toward the plate body 10 of the diffuser plate 1. The light-emitting area is defined with a light-emitting axis which extends vertically upward from a center point of the light-emitting area. In this embodiment, the light-emitting elements 92 are light-emitting diodes (LEDs), such as but not limited to: ordinary light-emitting diodes (LEDs), sub-millimeter light-emitting diodes (Mini LEDs), or even micro light-emitting diode (Micro LEDs). The reflective layer is provided on the top surface 911 of the substrate 91. The reflective layer can be white or other colors or surfaces with better light reflection effects, and is used to reflect light upwards toward the plate body 10 of the diffuser plate 1.

The plurality of secondary optical lenses 20 is respectively corresponding to and covering upon the plurality of light-emitting elements 92. Each of the secondary optical lenses 20 is fixed on the top surface 911 of the substrate 91 at a position corresponding to one of the light-emitting elements 92 and covers the light-emitting area of the light-emitting element 92. One of the technical characteristics of the present invention is that, each of the secondary optical lenses 20 can diffuse the light emitted from the light-emitting area of the corresponding light-emitting element 92 in a manner of refraction, reflection, or both refraction and reflection; moreover, among the light rays emitted upward from the light-emitting area of the light-emitting element 92, the light intensity within the angle range of +30° to −30° with the light-emitting axis is between 15% and 25% of the total light intensity of the light-emitting element 92, and the light intensity within the angle range of +60° to +70° and −60° to −70° with the light-emitting axis is between 75% and 85% of the total light intensity of the light-emitting element 92. The backlight module of the present invention can effectively shield MURA by using the novel light distribution design of the secondary optical lens 20 and the multiple diffusion effects provided by the diffuser plate 1 of the present invention described below, thereby generating a surface light source with improved brightness and uniformity. The appearance of the secondary optical lens 20 shown in FIG. 1 is only a simplified schematic diagram and is not a real appearance. The embodiment of the appearance of the secondary optical lens 20 of the present invention will be described later.

The plate body 10 of the diffuser plate 1 is located above the plurality of light-emitting elements 92 on the substrate 91 and is adjacent to the substrate 91. In this embodiment, there is no other element between the diffuser plate 1 and the secondary optical lenses 20 disposed on the substrate 91. In the present invention, the diffuser plate 1 comprises: a plate body 10, a first diffusion particle additive, a second diffusion particle additive, a plurality of microbubbles 1012, and a plurality of microstructures 1032. The plate body 10 has an upper surface and a lower surface. The lower surface of the plate body 10 faces the substrate 91 and is used as a light-entering surface. The light emitted by the light-emitting element 92 enters the plate body 10 through the lower surface (light-entering surface). In contrast, the upper surface of the plate body 10 is the light-output surface. Light entering the plate body 10 undergoes multiple refractions and diffusion effects before being emitted from the upper surface (light-output surface) of the plate body 10 and directed toward the liquid crystal display (LCD) 93 located above. The plate body 10 is a multi-layer plate structure formed by co-extrusion, and includes a main layer 101, an upper surface layer 102, and a lower surface layer 103. The upper surface layer 102 is stacked on the side of the main layer 101 facing the upper surface, and the lower surface layer 103 is stacked on the side of the main layer 101 facing the lower surface. The base material of the main layer 101 of the plate body 10 of the diffuser plate 1 can be a non-crystalline or semi-crystalline plasticized material, and the base material includes at least one of the following: polycarbonate (PC), polystyrene (PS), polymethyl methacrylate (PMMA, commonly known as acrylic), polyethylene (PE), polypropylene (PP), polyethylene terephthalate (PET), or a copolymer of any of the foregoing materials. The base materials of the upper surface layer 102 and the lower surface layer 103 of the plate body 10 are preferably polymethyl methacrylate (PMMA). In this embodiment, the thickness of the plate body 10 is preferably between 0.8 mm and 2.5 mm. In this embodiment, the applicable thickness ratio of the thickness of the main layer 101 to the total thickness of the two surface layers 102, 103 (the sum of the thicknesses of the upper and lower surface layers) can be implemented between the range of 9.5:0.5~1:1; however, the better implementation range thereof is between 9:1~7:3. The base materials of the main layer 101 and the two surface layers 102, 103 can be made of the same material or different materials.

In this embodiment, the first diffusion particle additive includes a plurality of first diffusion particles 1011, which are added to the main layer 101. The weight percentage of the added first diffusion particle additive in the main layer 101 is a first weight percentage; each of the first diffusion particles 1011 has a first material refractive index. The second diffusion particle additive includes a plurality of second diffusion particles 1021, 1031; these second diffusion particles 1021, 1031 are respectively added in the upper surface layer 102 and the lower surface layer 103. The weight percentage of the added second diffusion particle additive in the upper surface layer 102 and the lower surface layer 103 is a second weight percent; each of the second diffusion particles 1021, 1031 has a second material refractive index. The technical characteristic of the present invention is that the diffusion plate meets at least one of the following two conditions:

Condition 1: The first material refractive index of the first diffusion particles 1011 is smaller than the second material refractive index of the second diffusion particles 1021, 1031;

Condition 2: The first weight percentage of the first diffusion particle additive is less than the second weight percentage of the second diffusion particle additive.

By satisfying the above-mentioned Condition 1, or Condition 2, or both conditions are met, the refractive index of the upper and lower surface layers 102, 103 which are added with the second diffusion particles 1021, 1031 of relatively high refractive index or/and concentration (weight percentage) will be substantially higher than the refractive index of the main layer 101 which is added with the first diffusion particles 1011 of relatively low refractive index or/and concentration (weight percentage), so as to make the upper and lower surface layers 102, 103 to provide a slight reflection effect on the sides facing the main layer 101. Therefore, after the light emitted by the light-emitting elements 92 enters the interior of the plate body 10, a part of the light will be refracted or reflected several times in the main layer 101 between the upper and lower surface layers 102, 103 before being output from the upper surface (light-output surface). The number of refractions or reflections of light is increased inside the plate body 10 before being output from the upper surface (light-output surface) of the diffuser plate, and thereby, the light can be diffused more effectively, and the effect of shading MURA can be improved to produce a uniform surface light source In this embodiment, the plurality of first diffusion particles 1011 contained in the first diffusion particle additive includes at least one of the following polymer material diffusion particles: silicone beads, acrylic beads (PMMA beads), polystyrene beads (PS beads), acrylic-polystyrene copolymer beads (PMMA-PS beads). Wherein, the applicable range of particle size of the first diffusion particles 1011 is between 0.5-10 μm, but the best embodiment of the range is between 1-4 μm. The value of the first material refractive index is between 1.42 and 1.5. The applicable range of the first weight percentage of the first diffusion particle additive added in the main layer 101 is between 0.5-10%, but the best embodiment of the range is between 1-4%. Although the first and second diffusion particle additives described herein are commercially available conventional products, the amount of diffusion particles added (weight percentage) and the range of material refractive index and particle size are unique to this invention.

In the present invention, the plurality of second diffusion particles 1021, 1031 included in the second diffusion particle additive can have two kinds, the first kind is inorganic diffusion particles, and the second kind is polymer material diffusion particles. In the first kind, the plurality of second diffusion particles 1021, 1031 included in the second diffusion particle additive may include at least one of the following inorganic particles: calcium carbonate, barium sulfate, titanium oxide, talc, mica, boron nitride; wherein, the applicable range of particle size of the second diffusion particles 1021, 1031 is between 0.01-10 μm, but the best embodiment of the range is between 0.05-8 μm; the value of the second material refractive index is between 1.5 and 2.6; the applicable range of the second weight percentage of the second diffusion particle additive added in the upper and lower surface layers 102, 103 is between 0.1-3%, but the best embodiment of the range is between 0.1-1.5%. In the second kind, the plurality of second diffusion particles 1021, 1031 included in the second diffusion particle additive may include at least one of the following polymer material diffusion particles: silicone beads, Acrylic beads (PMMA beads), polystyrene beads (PS beads), acrylic-polystyrene copolymer particles (PMMA-PS beads); wherein, the applicable range of particle size of the second diffusion particles 1021, 1031 is between 10-50 μm, but the best embodiment of the range is between 15-25 μm; the value of the second material refractive index is between 1.42 and 1.5; the applicable range of the second weight percentage of the second diffusion particle additive added in the upper and lower surface layers 102, 103 is between 1-20%, but the best embodiment of the range is between 5-10%; moreover, in this second kind, the second weight percentage must be greater than the first weight percentage, and the particle size of the second diffusion particles 1021, 1031 is larger than the particle size of the first diffusion particle 1011. By using the second diffusion particle additive defined in the first kind and the second kind to match the first diffusion particle additive defined above, it can ensure that the refractive index of the upper and lower surface layers 102, 103 is substantially higher than the refractive index of the main layer 101, so as to achieve the features of more effective diffusion of light, enhanced shading of MURA, and better effect of generating a uniform surface light source.

As shown in FIG. 1, in the first embodiment of the diffuser plate of the present invention, a plurality of microstructures 1032 is arranged at least on the lower surface of the plate body 10 in order to further improve the light divergence effect of the diffuser plate. The microstructures include a plurality of N-sided pyramid-shaped structures, wherein N is a positive integer greater than or equal to three. In the best embodiment of the present invention, each of the microstructures is a pyramid-shaped cone structure with a quadrilateral bottom surface, so that the plurality of microstructures 1032 presents a plurality of pyramid-shaped microstructures arranged in an array. In addition, the main layer 101 of the plate body 10 is formed by foam extrusion molding, and includes a plurality of microbubbles 1012 in the main layer 101. An applicable range of the weight reduction rate of the microbubbles 1012 to the main layer 101 is 5-30%, but the best range of the weight reduction rate is between 10-20%, and an average size of the microbubbles 1012 is between 60-800 μm; wherein, a calculation formula of the weight reduction rate is:

$$\text{weight reduction rate (\%)} = (W1 - W2)/W2 * 100\%;$$

$$W1 = H * (L1 * L2 * D);$$

wherein:

H is an average thickness of the plate body (mm);

L1 is a length of the main layer (mm);

L2 is a width of the main layer (mm);

D is a density of a raw material of the main layer (g/mm$^3$);

W1 is a theoretical weight (g) of the main layer, that is, the weight when the microbubbles are not included;

W2 is an actual weight (g) of the main layer, that is, the actual weight of the main layer containing a plurality of the microbubbles is actually weighed by a scale.

In a preferred embodiment, the microbubbles 1012 are generated by adding a foaming agent and a nucleating agent during the foam extrusion molding of the main layer 101. The nucleating agent comprises at least one of the following: calcium carbonate, silicon dioxide, and calcium oxide. The practical range of the weight percentage of the added nucleating agent is 0.01%-5%, but the preferred range is 0.1%-0.5%. The weight reduction rate of the microbubbles 1012 can be controlled by the amount of the foaming agent added, and the control method of the bubble size of the microbubbles 1012 can be the addition of the nucleating agent and the adjustment of the process temperature. The process temperature of the foaming co-extrusion process of the multi-layer plate body 10 of the diffuser plate of the present invention is adjusted depending on the type of raw material resin and foaming agent. The process temperature of the present invention is the general polycarbonate process temperature, and the optimum temperature is between 220~270° C.

In this embodiment, the diffuser plate 1 further includes the optical film 151, the brightness enhancement film 152 (BEF), and the polarized dual brightness enhancement film 153 (DBEF). The optical film 151 is directly attached to the upper surface of the plate body 10 of the diffuser plate 1 with optical adhesive; the brightness enhancement film 152 is directly attached to the optical film 151 with optical adhesive; and the polarized dual brightness enhancement film 153 is directly attached to the brightness enhancement film 152 with optical adhesive. Brightness enhancement film (BEF) 152 and polarized dual brightness enhancement film (DBEF) 153 are films that can improve the light extraction efficiency of the backlight system. When the light-emitting elements 92 are white-light LEDs, the optical film 151 can be an optical diffusion film having a light diffusion function. When the light-emitting elements 92 are blue-light LEDs, the optical film 151 can be a quantum dot optical conversion film that can convert blue light into white light. The backlight module of the present invention can be assembled on a liquid crystal display (LCD) 93, and the liquid crystal display 93 is located above the polarized dual brightness enhancement film 153. The optical adhesive, optical film 151, brightness enhancement film 152 and polarized dual brightness enhancement film 153 are all conventional products available on the market.

Figures 2A, 2B, 2C:
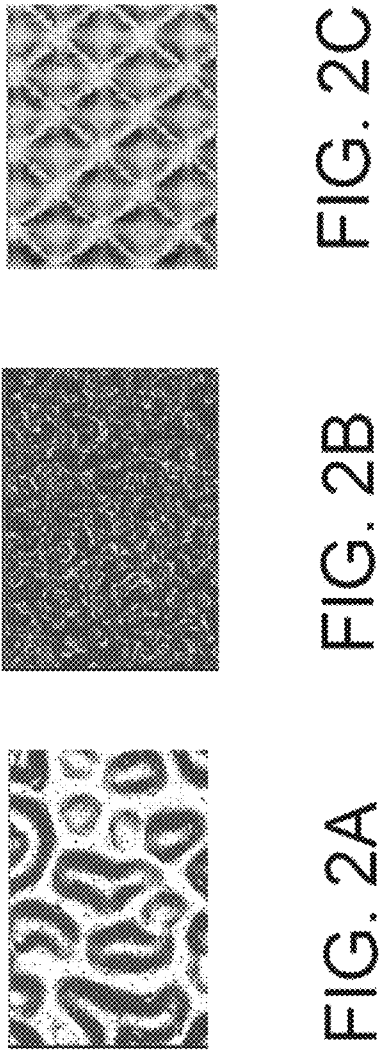
FIG. 2A, FIG. 2B and FIG. 2C are schematic diagrams of three different embodiments of patterns of the microstructures provided on the bottom surface of the diffuser plate of the present invention.

Please refer to FIG. 2A, FIG. 2B and FIG. 2C, which are schematic diagrams of three different embodiments of patterns of microstructures arranged on the lower surface of the diffuser plate of the present invention. The diffuser plate of the present invention is formed with a plurality of microstructures 1032 at least on the lower surface of the plate body 10 by means of extrusion and/or molding process. The microstructures 1032 have a plurality of convex and concave portions, and the structures of these concave and convex portions can be regularly or irregularly distributed on the lower surface of the plate body 10. When viewing in the top view, the microstructures 1032 can be shaped like round, amoeba (as shown in FIG. 2A), irregular matte (as shown in FIG. 2B), pyramid-shaped (as shown in FIG. 2C), and other shapes. Among them, the overall luminance effect will be the best when the light-entering (light-input) surface of the plate body 10 is provided with pyramid-shaped microstructures. This is because the pyramid-shaped microstructures can reflect part of the light traveling downward (toward the LED elements) upward, thereby increasing the brightness. This is because the pyramid-shaped microstructures can partially reflect the light traveling downward (toward the LED element) inside the plate body 10 upward, thereby improving the brightness.

The backlight module of the present invention adopts a direct-type LED light source, and the LED light source is equipped with a refractive-reflective hybrid secondary optical lens. The secondary optical lens focuses light in front of the LED light-emitting element, and the reflective surface of the secondary optical lens reflects the side light out thereof, thereby changing the light output of the LED light source. The light intensity within the angle range of +30° to −30° on the LED light-emitting element is increased due to the light distribution effect of the refractive-reflective hybrid secondary optical lens. Therefore, the present invention furnishes a plurality of pyramid-shaped microstructures on the light-entering surface of the diffuser plate, which is matched with the secondary optical lens to increase total reflection and improve light efficiency (brightness). In addition, with the diffuser plate co-extruded by foaming technology, the diffusion particles and microbubbles inside the main layer achieve good light diffusion rate, make the light more uniform, and achieve good MURA shielding.

The most common secondary optical lenses for LED light-emitting elements are reflective secondary optical lenses and refractive secondary optical lenses. Conventional reflective secondary optical lens can maximize light concentration along the light axis of the LED light-emitting element. Conventional refractive secondary optical lens can diverge most of the light emitted by the LED light-emitting element to a larger angle, while the light intensity in the light axis direction is much lower. The refractive-reflective hybrid secondary optical lens of the present invention has both reflective and refractive structures, which can optimize the light distribution of the light emitted by the LED light-emitting element, so that most of the light emitted by the LED light-emitting element can be dispersed to a larger angle while also allowing the light directly above (and along the light axis of) the LED light-emitting element to have an appropriate intensity. Therefore, the present invention furnishes a refractive-reflective hybrid secondary optical lens on the LED light-emitting element, and matches it with the uniquely designed diffusion plate of the present invention, which can improve the light output brightness of the backlight module and achieve the effect of uniform light (reducing MURA).

Figures 3A, 3B, 3C:
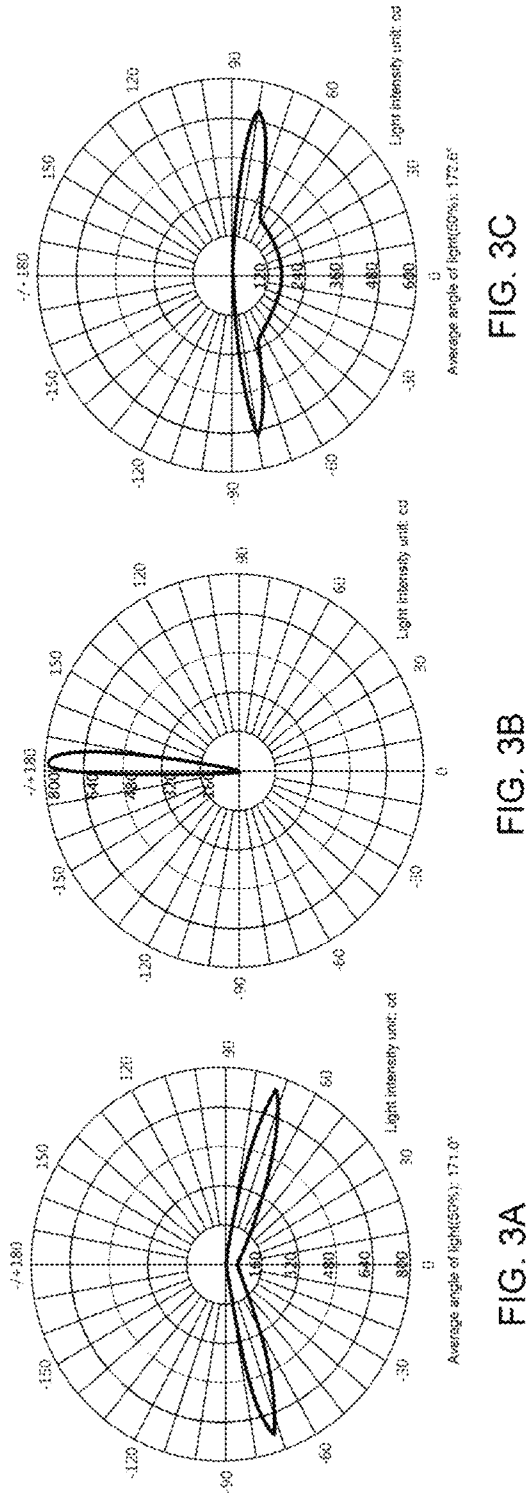
FIG. 3A, FIG. 3B and FIG. 3C are schematic figures of the light intensity distribution (light distribution) of a conventional reflective secondary optical lens, a conventional refractive secondary optical lens, and a refractive-reflective hybrid secondary optical lens of the present invention, respectively.

Please refer to FIG. 3A, FIG. 3B and FIG. 3C, which are schematic figures of the light intensity distribution (light distribution) of a conventional reflective secondary optical lens, a conventional refractive secondary optical lens, and a refractive-reflective hybrid secondary optical lens of the present invention, respectively. As shown in FIG. 3A, when using a conventional reflective secondary optical lens on the LED light-emitting element, the light intensity of the light emitted by the LED light-emitting element directly above (with an angle range of plus or minus 5 degrees to the light axis) the LED light-emitting element accounts for almost 100% of the total light intensity of the LED light-emitting element. In contrast, as shown in FIG. 3B, when using a conventional refractive secondary optical lens, the light intensity of the light emitted by the LED light emitting element directly above (with an angle range of plus or minus 5 degrees to the light axis) the LED light-emitting element only accounts for about 10% or less of the total light intensity of the LED light-emitting element; however, the total light intensity within the angle ranges of +60° to +70° and −60° to −70° with the light axis is about 90% or more of the total light intensity of the LED light-emitting element. As shown in FIG. 3C, when the refractive-reflective hybrid secondary optical lens of the present invention is used, the total intensity of the light emitted by the LED light-emitting element within the angle range of +30° to −30° with respect to the light axis is between 15% and 25% (with 20% being optimal) of the total intensity of light emitted by the LED light-emitting element. In addition, the total light intensity within the angle range of +60° to +70° and −60° to −70° with respect to the light axis is between 75% and 85% (with 80% being optimal) of the total intensity of light emitted by the LED light-emitting element. Please refer to Table 1 below for a comparison of light intensity at different angle ranges when LED light-emitting elements are used with conventional reflective secondary optical lenses, conventional refractive secondary optical lenses, and the refractive-reflective hybrid secondary optical lens of the present invention. As can be seen from FIGS. 3A to 3C and Table 1, the refractive-reflective hybrid secondary optical lens of the present invention can properly distribute the light emitted by the LED light-emitting element compared to the conventional technologies. This allows most of the light (75% to 85% of total light intensity) emitted by the LED light-emitting element to be dispersed to a larger angle (+60° to +70° and −60° to −70° angle ranges with respect to the light axis), while also allowing light with appropriate intensity (15% to 25% of total light intensity) directly above the LED light-emitting element (within the angle range of +30° to −30° with respect to the light axis). The light distribution feature provided by the refractive-reflective hybrid secondary optical lens of the present invention is used in conjunction with the aforementioned diffuser plate of the present invention to optimize the light distribution and diffusion of the LED light, thereby shielding the MURA and generating a uniform surface light source with enhanced brightness.

TABLE 1

Comparison of light intensities of different secondary optical lenses at different angles

| Secondary optical lens types | 0° (right above the LED) | +60°~+70°/ −60°~−70° | +30°~−30° |
|---|---|---|---|
| Conventional reflective | 100% | — | — |
| Conventional refractive | 10% | 45% / 45% | — |
| Refractive-reflective hybrid of the present invention | — | 80% | 20% |

Figure 4:
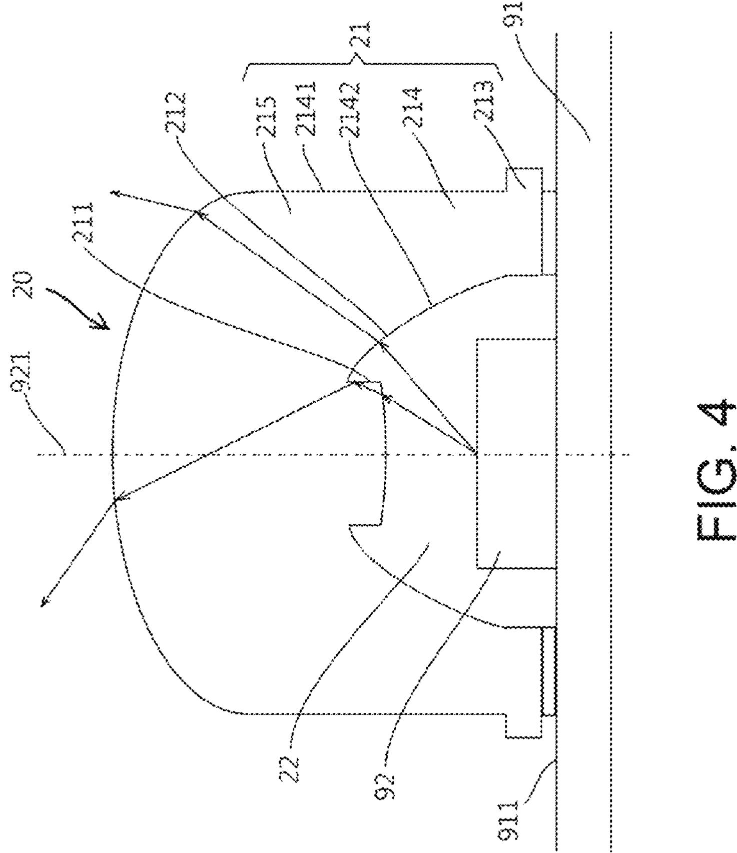
FIG. 4 is a schematic diagram of an embodiment of a refractive-reflective hybrid secondary optical lens of a backlight module capable of enhancing brightness according to the present invention.

Please refer to FIG. 4, which is a schematic diagram of an embodiment of a refractive-reflective hybrid secondary optical lens of a backlight module capable of enhancing brightness according to the present invention. In the present invention, the secondary optical lens 20 is a refractive-reflective hybrid optical lens. Each of the secondary optical lenses 20 comprises a lens body 21 and a blind-hole space 22 located inside the lens body 21. The LED light-emitting element 92 is accommodated in the blind-hole space 22 and is covered by the lens body 21. The inner surface of the lens body 21 (that is, the inner surface surrounding the blind-hole space 22) of the secondary optical lens 20 has at least one reflective surface 211 and at least one refractive surface 212. When the light is emitted from the light-emitting area of the LED light-emitting element 92 located in the blind-hole space 22, if the light is incident on the reflective surface 211, it will be reflected by the reflective surface 211; however, if the light is incident on the refractive surface 212, then it will be refracted at least once and then emitted out of the lens body 21. The lens body 21 has a bottom part 213, a side extension part 214 and a light-output part 215 from bottom to top. The bottom part 213 is fixed to the top surface 911 of the substrate 91. The side extension part 214 extends upward from the bottom part 213 to a height that is not less than a thickness (height) of the LED light-emitting element 92. The light-output part 215 is located at the top of the side extension part 214 and includes a curved outer surface 2141 exposed to the outside and a curved inner surface 2142 exposed to the blind-hole space 22.

In this embodiment, the top (upper) area of the curved outer surface 2141 generally presents a convex surface that is similar to a sphere or a bullet head and bulges outward (upward). In addition, the curved outer surface 2141 closer to the bottom part 213 is similar to the side surface of a cylinder, that is, the curvature of different regions in the vertical direction remains substantially constant. By combining the structure of the curved outer surface 2141 and the curved inner surface 2142, the lens body 21 provides a focusing function of a convex lens in the area directly above the LED light-emitting element 92 where the angle between the area of focusing function and the light axis is within the range of plus or minus 30 degrees, thereby increasing the amount/intensity of light output by the LED light-emitting element 92 within the range of plus or minus 30 degrees above the lens body 21. In addition to the area of the aforementioned focusing function of the convex lens, the other areas of the lens body 21 provide a light diffusion function of a concave lens. The reflective surface 211 is provided at the junction of the convex lens and the concave lens, and is used to reflect and diverge a portion of the light entering the lens body 21 from the convex lens area, so as to balance the light output in the area directly above the LED light-emitting element 92 and other side areas. The location, area, size, curvature, etc. of the reflective surface 211 and the refractive surface 212 are designed based on the physical laws of light refraction and reflection and the refractive index of the lens body 21 material, so as to achieve the objective of the present invention that, the total intensity of the light emitted by the LED light-emitting element 92 within the angle range of +30° to −30° with respect to the light axis 921 is between 15% and 25% (with 20% being optimal) of the total intensity of light emitted by the LED light-emitting element 92; and moreover, the total light intensity within the angle range of +60° to +70° and −60° to −70° with respect to the light axis 921 is between 75% and 85% (with 80% being optimal) of the total intensity of light emitted by the LED light-emitting element 92.

In one embodiment, the at least one reflective surface is provided on the curved inner surface of the light-output part of the lens body of the secondary optical lens, and except for the reflective surface, other parts of the curved inner surface of the light-output part are all provided with the refractive surface. In this embodiment, the structure of the at least one reflective surface is one of the following: a reflective coating applied to the curved inner surface of the light-output part at a location corresponding to the at least one reflective surface; a reflective film attached to the curved inner surface of the light-output part at a location corresponding to the at least one reflective surface; an inclined plane with an appropriate inclination angle provided on the curved inner surface of the light-output part at a location corresponding to the at least one reflective surface in order to reflect the light emitted from the light-emitting area of the LED light-emitting element; and a curved surface with a suitable curvature provided on the curved inner surface of the light-output part at a location corresponding to the at least one reflective surface in order to reflect the light emitted from the light-emitting area of the LED light-emitting element.

In another embodiment, the at least one reflective surface is provided on the curved outer surface of the light-output part of the lens body of the secondary optical lens, and except for the reflective surface, other parts of the curved outer surface of the light-output part are all provided with the refractive surface. In this embodiment, the structure of the at least one reflective surface is one of the following: a reflective coating applied to the curved outer surface of the light-output part at a location corresponding to the at least one reflective surface; a reflective film attached to the curved outer surface of the light-output part at a location corresponding to the at least one reflective surface; an inclined plane with an appropriate inclination angle provided on the curved outer surface of the light-output part at a location corresponding to the at least one reflective surface in order to reflect the light emitted from the light-emitting area of the LED light-emitting element; and a curved surface with a suitable curvature provided on the curved outer surface of the light-output part at a location corresponding to the at least one reflective surface in order to reflect the light emitted from the light-emitting area of the LED light-emitting element.

Based on the aforementioned technical concept, the Applicant of the present invention produced several different diffuser plates and uses different types of secondary optical lenses for testing. Each diffuser plate has different structural parameters, including: whether the plate has diffusion particles and microbubbles, the type of microstructure on the light-entering surface, the type of secondary optical lens, etc. Then, the Applicant tested or observed several optical effects (including brightness, chromaticity value, taste, etc.) of these diffuser plates and secondary optical lenses with different parameters one by one, and analyzed and compared these optical effects. The results are summarized in Table 2 below.

TABLE 2

Comparison of optical effects of different diffuser plates with different secondary optical lenses

| | | | | | | | | |
|---|---|---|---|---|---|---|---|---|
| y | 0.2490 | 0.2496 | 0.2492 | 0.2485 | 0.2603 | 0.2608 | 0.2629 | 0.2650 |
| x | 0.2651 | 0.2651 | 0.2651 | 0.2649 | 0.2727 | 0.2733 | 0.2807 | 0.2807 |
| L center | 9.263 | 9445 (+1.97%) | 9545 (+3.04%) | 9575 (+3.37%) | 3648 | 3876 (+6.25%) | 4316 | 4647 (+7.67%) |
| Taste (5 is the best) | 5 | 5 | 3 | 5 | 5 | 5 | 5 | 5 |
| type of lens | Refraction | | Refractive-reflective hybrid | | Refractive-reflective | | Refractive-reflective hybrid | |
| LED chip*row | 10*6 | | | | 24*1 | | 12*3 | |
| OD (mm) | 21 | | | | 34.5 | | 25 | |
| thickness (mm) | 1.5 | | | | 1.5 | | 1.5 | |
| Tt % | 33 | | | | 33 | | 45 | |
| microstructure on the light-entering surface | mat | pyramid | pyramid | mat | mat | pyramid | mat | pyramid |
| Diffuser | Diffusion | Diffusion | Diffusion | Diffusion | Diffusion | Diffusion | Diffusion | Diffusion |

TABLE 2-continued

| Comparison of optical effects of different diffuser plates with different secondary optical lenses | | | | | | | | |
|---|---|---|---|---|---|---|---|---|
| Plate | particle | particle | particle | particle + microbubble | particle + microbubble | particle + microbubble | particle + microbubble | particle + microbubble |
| Sample Name | Example 1 | Example 2 | Example 3 | Embodiment 1 | Embodiment 2 | | Embodiment 3 | |

In Table 2 above, "Diffusion particles" in the "Diffuser Plate" column indicates that the diffuser plate contains a plurality of diffusion particles but no microbubbles, while "Diffusion particles+microbubbles" indicates that the diffuser plate contains both diffusion particles and microbubbles. "Mat" in the "Microstructure on the light-entering surface" column indicates that irregular matte microstructures are provided on the lower surface (light-entering surface) of the plate body, while "Pyramid" indicates that pyramid-shaped microstructures are provided on the lower surface (light-entering surface) of the plate body. The value in the "Tt %" column is the percentage of total light transmittance (%) of the diffuser plate. The values in the "Thickness" and "OD" columns refer to the thickness (mm) and the optical path distance (mm) of the diffuser plate, respectively. The value of "LED chip*row" refers to the number of LED light-emitting elements on the substrate (number of chips per row times number of rows in the LED array). The "Taste" column is based on visually inspecting the optical taste of the light-output surface of the diffuser plate. The value is expressed on a scale of 1 to 5, where 1 indicates the worst visual optical taste and 5 indicates the best taste. The value in the "L center" column indicates the luminance value of the center area of the light-output surface, wherein the value in the parentheses marks indicates the percentage increase or decrease compared with the luminance value of the previous embodiment. The values in the "x" and "y" columns refer to the chromaticity values in the x and y directions, respectively. As shown in Table 2, when comparing comparative Example 1 and comparative Example 2, the difference in brightness (luminance) between the diffuser plates with the same conventional refractive secondary optical lens but with different microstructures on the light-entering surface (i.e., Example 1 is with irregular matte microstructures, while Example 2 is with pyramid-shaped microstructures) is negligible. In comparative Example 3, the light-entering surface of the diffuser plate of comparative is provided with pyramid-shaped microstructures, no microbubble is formed inside the plate body, and a refractive-reflective hybrid secondary optical lens of the present invention is used in Example 3; although the brightness is increased, but the visual taste is deteriorated. The pyramid-shaped microstructures of the diffuser plate of Embodiment 1 of the present invention are applied together with the refractive-reflective hybrid secondary optical lens of the present invention, which not only increases brightness but also maintains good visual taste, achieving better optical effects than comparative Examples 1-3.

In Embodiments 2 and 3 of the present invention, when the light-entering surface of the diffuser plate is provided with pyramid-shaped microstructures and are applied together with the refractive-reflective hybrid secondary optical lens of the present invention, not only the brightness is increased, but also the visual taste is good, so as to achieve better optical effects than comparative Examples 1-3. Furthermore, the difference in the "L center" column values obtained when the diffuser plate's "Microstructure on the light-entering surface" column is configured with two different microstructures, "mat" and "pyramid" as shown in Embodiments 2 and 3, indicates that when the diffuser plate's light-entering surface is configured with pyramid-shaped microstructures, its luminance value (brightness) can be increased by at least 6% compared to when the light-entering surface is configured with matte microstructures. This clearly demonstrates that the diffuser plate of the present invention can indeed improve brightness (light output efficiency) when the pyramid-shaped microstructures are configured on the light-entering surface of the plate body of the diffuser plate.

While the present invention has been particularly shown and described with reference to a preferred embodiment, it will be understood by those skilled in the art that various changes in form and detail may be without departing from the spirit and scope of the present invention.

What is claimed is:

1. A backlight module capable of enhancing brightness, comprising:
- a substrate, having a top surface; a circuit layout and a reflective layer being provided on the substrate; the reflective layer being located on the top surface;
- a plurality of LED light-emitting elements, being arranged in an array on the top surface of the substrate and electrically coupled to the circuit layout; each of the LED light-emitting elements having a light-emitting area that can emit light; the light-emitting area being defined with a light-emitting axis which extends vertically upward from a center point of the light-emitting area;
- a plurality of secondary optical lenses, each of said secondary optical lenses being fixed on the top surface of the substrate at a position corresponding to one of the LED light-emitting elements and covering the light-emitting area of the corresponding LED light-emitting element; and
- a diffuser plate, locating above the substrate and comprising:
  - a plate body, having an upper surface and a lower surface, the lower surface facing the substrate; the plate body being a multi-layer structure formed by co-extrusion, comprising a main layer, an upper surface layer, and a lower surface layer; the upper surface layer is stacked on a side of the main layer facing the upper surface, and the lower surface layer is stacked on another side of the main layer facing the lower surface;
  - a plurality of first diffusion particles, added to the main layer;
  - a plurality of second diffusion particles, added to the upper surface layer and the lower surface layer;
  - a plurality of microbubbles, being formed in the main layer by a foaming co-extrusion process; and
  - a plurality of microstructures, being arranged in an array on at least the lower surface of the plate body;
- wherein, each of the secondary optical lenses is capable of diffusing the light emitted from the light-emitting area of the corresponding light-emitting element in a manner of refraction, reflection, or both refraction and reflection; in addition, among the light emitted upward from the light-emitting area of the light-emitting element, a light intensity within an angle range of +30° to −30° with the light-emitting axis is between 15% and 25% of the total light intensity of the light-emitting element, and the light intensity within the angle range of +60° to +70° and −60° to −70° with the light-emitting axis is between 75% and 85% of the total light intensity of the light-emitting element.

2. The backlight module capable of enhancing brightness of claim 1, wherein:

a base material of the main layer of the plate body includes at least one of the following: polycarbonate (PC), polystyrene (PS), polymethyl methacrylate (PMMA, commonly known as acrylic), polyethylene (PE), polypropylene (PP), and polyethylene terephthalate (PET); base materials of the upper surface layer and the lower surface layer of the plate body include polymethyl methacrylate (PMMA);

the first diffusion particles are formed by adding a first diffusion particle additive to the main layer; the first diffusion particle additive includes said first diffusion particles; the weight percentage of the added first diffusion particle additive in the main layer is a first weight percentage; each of the first diffusion particles has a first material refractive index; and the second diffusion particles are formed by adding a second diffusion particle additive to both the upper surface layer and the lower surface layer; the second diffusion particle additive includes said second diffusion particles; the weight percentage of the added second diffusion particle additive in the upper surface layer and the lower surface layer is a second weight percentage; each of the second diffusion particles has a second material refractive index;

wherein the diffuser plate meets at least one of the following two conditions:

Condition 1: the first material refractive index of the first diffusion particles is smaller than the second material refractive index of the second diffusion particles; and Condition 2: the first weight percentage of the first diffusion particle additive is less than the second weight percentage of the second diffusion particle additive.

3. The backlight module capable of enhancing brightness of claim 2, wherein, the first diffusion particles contained in the first diffusion particle additive include at least one of the following polymer particles: silicone beads, acrylic beads (PMMA beads), polystyrene beads (PS beads), and acrylic-polystyrene copolymer beads (PMMA-PS beads); wherein a particle size of the first diffusion particles is between 1-4 μm; a value of the first material refractive index is between 1.42 and 1.5; the first weight percentage of the first diffusion particle additive added in the main layer is between 1-4%.

4. The backlight module capable of enhancing brightness of claim 3, wherein, the second diffusion particles contained in the second diffusion particle additive include at least one of the following polymer particles: silicone beads, acrylic beads (PMMA beads), polystyrene beads (PS beads), and acrylic-polystyrene copolymer beads (PMMA-PS beads); wherein a particle size of the second diffusion particles is between 15-25 μm; a value of the second material refractive index is between 1.42 and 1.5; the second weight percentage of the second diffusion particle additive added in the upper surface layer and the lower surface layer is between 5-10%; wherein, the second weight percentage is greater than the first weight percentage, and the particle size of the second diffusion particles is greater than the particle size of the first diffusion particles.

5. The backlight module capable of enhancing brightness of claim 3, wherein, the second diffusion particles contained in the second diffusion particle additive include at least one of the following inorganic particles: calcium carbonate, barium sulfate, titanium oxide, talc, mica, and boron nitride; wherein a particle size of the second diffusion particles is between 0.05-8 μm; a value of the second material refractive index is between 1.5 and 2.6; the second weight percentage of the second diffusion particle additive added in the upper surface layer and the lower surface layer is between 0.1-1.5%.

6. The backlight module capable of enhancing brightness of claim 5, wherein:

the microbubbles are generated by adding a foaming agent and a nucleating agent during the foaming co-extrusion process;

the nucleating agent comprises at least one of the following: calcium carbonate, silicon dioxide, and calcium oxide; a weight percentage of the added nucleating agent is 0.1%-0.5% a weight reduction rate of the microbubbles to the main layer is 10-20%, and an average size of the microbubbles is between 60~800 μm; wherein, a calculation formula of the weight reduction rate is:

$$\text{weight reduction rate } (\%) = (W1 - W2)/W2 * 100\%;$$

$$W1 = H * (L1 * L2 * D);$$

wherein:

H is an average thickness of the main layer (mm);

L1 is a length of the main layer (mm);

L2 is a width of the main layer (mm);

D is a density of a raw material of the main layer ($g/mm^3$);

W1 is a theoretical weight (g) of the main layer, that is, the weight when the microbubbles are not included;

W2 is an actual weight (g) of the main layer, that is, the actual weight of the main layer containing the microbubbles is actually weighed by a scale.

7. The backlight module capable of enhancing brightness of claim 1, wherein:

each of the secondary optical lenses comprises a lens body and a blind-hole space located inside the lens body; the LED light-emitting element is accommodated in the blind-hole space and is covered by the lens body; the secondary optical lens is a refractive-reflective hybrid optical lens;

the lens body of the secondary optical lens has at least one reflective surface and at least one refractive surface; when the light is emitted from the light-emitting area of the LED light-emitting element located in the blind-hole space, the light will be reflected by the reflective surface if the light is incident on the reflective surface, otherwise, the light will be refracted at least once and then emitted out of the lens body if the light is incident on the refractive surface;

the lens body has a bottom part, a side extension part and a light-output part from bottom to top; the bottom part is fixed to the top surface of the substrate; the side extension part extends upward from the bottom part to a height that is not less than a thickness of the LED light-emitting element; the light-output part is located at the top of the side extension part and includes a curved outer surface exposed to the outside and a curved inner surface exposed to the blind-hole space.

8. The backlight module capable of enhancing brightness of claim 7, wherein, the at least one reflective surface is provided on the curved inner surface of the light-output part of the lens body of the secondary optical lens, and except for the reflective surface, other parts of the curved inner surface of the light-output part are all provided with the refractive surface; a structure of the at least one reflective surface is one of the following: a reflective coating applied to the curved inner surface of the light-output part at a location corresponding to the at least one reflective surface; a reflective film attached to the curved inner surface of the light-output part at the location corresponding to the at least one reflective surface; an inclined plane with an appropriate inclination angle provided on the curved inner surface of the light-output part at the location corresponding to the at least one reflective surface in order to reflect the light emitted from the light-emitting area of the LED light-emitting element; and a curved surface with a suitable curvature provided on the curved inner surface of the light-output part at the location corresponding to the at least one reflective surface in order to reflect the light emitted from the light-emitting area of the LED light-emitting element.

9. The backlight module capable of enhancing brightness of claim 7, wherein, the at least one reflective surface is provided on the curved outer surface of the light-output part of the lens body of the secondary optical lens, and except for the reflective surface, other parts of the curved outer surface of the light-output part are all provided with the refractive surface; a structure of the at least one reflective surface is one of the following: a reflective coating applied to the curved outer surface of the light-output part at a location corresponding to the at least one reflective surface; a reflective film attached to the curved outer surface of the light-output part at the location corresponding to the at least one reflective surface; an inclined plane with an appropriate inclination angle provided on the curved outer surface of the light-output part at the location corresponding to the at least one reflective surface in order to reflect the light emitted from the light-emitting area of the LED light-emitting element; and a curved surface with a suitable curvature provided on the curved outer surface of the light-output part at the location corresponding to the at least one reflective surface in order to reflect the light emitted from the light-emitting area of the LED light-emitting element.

10. The backlight module capable of enhancing brightness of claim 7, wherein, the microstructures include a plurality of N-sided pyramid-shaped structures, wherein N is a positive integer greater than or equal to three; the backlight module further comprises:

an optical film, directly attached to the upper surface of the plate body of the diffuser plate;

a brightness enhancement film (BEF), directly attached to the optical film; and a dual brightness enhancement film (DBEF), directly attached to the brightness enhancement film (BEF);

wherein the backlight module is configured to be assembled on a liquid crystal display (LCD), and the LCD is located above the dual brightness enhancement film (DBEF).

* * * * *